US012779961B2

(12) United States Patent
Jüngling et al.

(10) Patent No.: US 12,779,961 B2
(45) Date of Patent: Nov. 3, 2026

(54) ROOF SYSTEM FOR A VEHICLE

(71) Applicant: Inalfa Roof Systems Group B.V., Oostrum (NL)

(72) Inventors: Rainer Gerhard Jüngling, Mönchengladbach (DE); Ward Johannes van den Boomen, Netersel (NL); Claudia Gerardus Maria Hamers, Venray (NL); Mert Memduh Tascioglu, Eindhoven (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 317 days.

(21) Appl. No.: 18/526,392

(22) Filed: Dec. 1, 2023

(65) Prior Publication Data

US 2024/0181853 A1 Jun. 6, 2024

(30) Foreign Application Priority Data

Dec. 6, 2022 (EP) .................................... 22211774

(51) Int. Cl.
*B60J 7/057* (2006.01)
*B60J 7/043* (2006.01)
(Continued)

(52) U.S. Cl.
CPC ............. *B60J 7/0573* (2013.01); *B60J 7/043* (2013.01); *B60J 7/192* (2013.01); *E05D 15/10* (2013.01);
(Continued)

(58) Field of Classification Search
CPC .......... B60J 7/0573; B60J 7/043; B60J 7/192; E05F 15/60; E05D 15/10; E05Y 2201/626;
(Continued)

(56) References Cited

U.S. PATENT DOCUMENTS 4,081,926 A * 4/1978 Jardin .................... B60J 7/0573 49/210
4,749,227 A * 6/1988 Bienert .................... B60J 7/022 296/222
(Continued)

FOREIGN PATENT DOCUMENTS

DE 102013109099 B3 12/2014
EP 1586475 B2 10/2005

OTHER PUBLICATIONS

Search Report in corresponding European patent application serial No. 22211774.9 dated May 30, 2023.

*Primary Examiner* — Taras P Bemko
(74) *Attorney, Agent, or Firm* — Steven M. Koehler; Westman, Champlin & Koehler, P.A.

(57) ABSTRACT

A vehicle roof system for comprises a closure panel having a panel support and a stationary guide rail at each longitudinal side of a roof opening for slidably guiding an operating mechanism that operates the closure panel. The operating mechanism comprises a rear device for moving the closure panel rear edge towards a raised position. A front device includes a first lever for moving the closure panel front edge vertically. A driving slide is drivable by a drive member to move the closure panel both in vertical and horizontal directions through the front and rear devices. The first lever is pivotally connected to the panel support only and has a first slide shoe engaging a stationary guide curve of the guide rail, that includes a downwardly and forwardly inclining front portion. The first lever slides and tilts when the shoe travels through the front portion of the stationary guide curve.

8 Claims, 7 Drawing Sheets

(51) Int. Cl.
*B60J 7/19* (2006.01)
*E05D 15/10* (2006.01)
*E05F 15/60* (2015.01)

(52) U.S. Cl.
CPC ......... *E05F 15/60* (2015.01); *E05Y 2201/626* (2013.01); *E05Y 2201/684* (2013.01); *E05Y 2201/708* (2013.01); *E05Y 2900/542* (2013.01)

(58) Field of Classification Search
CPC ......... E05Y 2201/684; E05Y 2201/708; E05Y 2900/542
See application file for complete search history.

(56) References Cited

U.S. PATENT DOCUMENTS

| | | | | | |
|---|---|---|---|---|---|
| 6,135,544 | A * | 10/2000 | Kohlpaintner | B60J 7/04 | 296/217 |
| 6,431,644 | B1 * | 8/2002 | Nagashima | B60J 7/022 | 296/223 |
| 6,582,014 | B1 * | 6/2003 | Racine | B60J 7/0435 | 296/223 |
| 7,178,862 | B2 | 2/2007 | Oechel | | |
| 9,145,043 | B2 * | 9/2015 | Nellen | B60J 7/047 | |
| 2005/0231007 | A1 | 10/2005 | Oechel | | |
| 2009/0091160 | A1 * | 4/2009 | Geerets | B60J 7/0046 | 296/216.04 |
| 2012/0139284 | A1 * | 6/2012 | Lee | B60J 7/0015 | 296/97.4 |
| 2013/0328355 | A1 * | 12/2013 | Nellen | B60J 7/057 | 296/223 |

* cited by examiner

ROOF SYSTEM FOR A VEHICLE

BACKGROUND

The discussion below is merely provided for general background information and is not intended to be used as an aid in determining the scope of the claimed subject matter.

Aspects of the invention relate to a roof system for a vehicle.

A roof system for a vehicle having a roof opening in a roof part thereof comprises a closure panel. The closure panel comprises a panel support and a stationary guide rail at each longitudinal side of said roof opening, suitable for slidably guiding an operating mechanism that operates the closure panel in a longitudinal direction of the vehicle. The operating mechanism comprises a rear device connected to the panel support for moving the rear edge of the closure panel towards a raised position. A front device is connected to the panel support and includes a first lever for moving the front edge of the closure panel in a vertical direction. A driving slide is slidably accommodated in each guide rail and is drivable by a drive member in order to move the closure panel both in vertical and in horizontal direction through the front device and rear device.

Such roof system is known from the prior art. In this prior art roof system, a panel support of the closure panel is provided with a front slide shoe, while the lever of the front device is provided behind this front slide shoe.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A roof system for a vehicle having a roof opening in a roof part thereof comprises a closure panel. The closure panel comprises a panel support and a stationary guide rail at each longitudinal side of said roof opening, suitable for slidably guiding an operating mechanism that operates the closure panel in a longitudinal direction of the vehicle. The operating mechanism comprises a rear device connected to the panel support for moving the rear edge of the closure panel towards a raised position. A front device is connected to the panel support and includes a first lever for moving the front edge of the closure panel in a vertical direction. A driving slide is slidably accommodated in each guide rail and is drivable by a drive member in order to move the closure panel both in vertical and in horizontal direction through the front device and rear device.

The first lever of the front device is pivotally connected to the panel support only and is provided with a first slide shoe which is in engagement with a stationary guide curve of the stationary guide rail, that includes a downwardly and forwardly inclining front portion, such that the first lever slides and tilts when the slide shoe travels through the front portion of the stationary guide curve.

So now the first slide shoe of the front device is attached to a first lever that not only slides but also rotates when the slide shoe travels through the inclining front portion, this lever may increase the lifting movement of the front end of the panel support, if desired, so that a higher lifting movement could be obtained or the same lifting movement with a lower front portion, thereby decreasing the total package at the front of the roof system. Further, it is advantageous to have a slide shoe mounted to a separate lever, because it is now easier to lengthen or shorten the simplified panel support, thereby making it easier to modify the design of the roof system (long-er/shorter) thus increasing the modularity of the roof system. The first lever also enables the panel support to rotate, for example between the closed position and the venting position, without rotating the slide shoe(s) at the front of the closure panel as the panel support may rotate with respect to the first lever which may be stationary. This simplifies the design of the slide shoe(s) and guide curve.

Preferably, the first lever comprises a second slide shoe at a distance in longitudinal direction behind the first slide shoe, which second slide shoe is preferably in engagement with the stationary guide curve.

This is a very simple manner to cause the first lever to rotate when the first slide shoe travels through the inclining front portion of the stationary guide curve.

For example, the second slide shoe may be in engagement with a substantially straight portion of the stationary guide curve connecting to a rear end of the front portion thereof.

In one embodiment, the panel support is connected to the first lever at a position above and in front of the first slide shoe.

This increases the leverage of the first lever of the front device.

The first lever may comprise a third slide shoe substantially in line with the first slide shoe and in engagement with a second stationary guide curve parallel to the stationary guide curve, wherein the third slide shoe may be laterally spaced from the first slide shoe, and wherein the first and second slide shoes are positioned on one side of the panel support and the third slide shoe is positioned on opposite side of the panel support These features will increase the stability of the front device.

In a particular embodiment, the panel support is attached to the closure panel via a plurality of screwed connections, wherein a front screwed connection is arranged at a longitudinal position between the first and second slide shoes considered in the closed position of the closure panel and is reachable with a tool from the side of the panel support where the third slide shoe is positioned.

This makes it possible to change the height of the closure panel at the front side when the closure panel is in its closed position and to tighten the connection when correct. Adapting the height of the closure panel is easiest in its closed position because the fixed roof of the vehicle is the reference height then.

Preferably, the front device comprises a second lever which is pivotally connected to the panel support on one of its ends and which is controlled by the driving slide, such that the second lever is allowed to pivot when the closure panel is moved in vertical direction, and which is driven by the driving slide when the closure panel is moved in longitudinal direction.

This second lever enables both the vertical and longitudinal movements of the closure panel at it front side.

Preferably, the driving slide and the second lever are in engagement with each other through a curve and pin connection, wherein the curve has a sliding portion enabling the pin to move with respect to the curve in longitudinal direction of the vehicle and a locking portion disabling the pin to move with respect to the curve in longitudinal direction of the vehicle.

This results in a reliable switch between rotational and sliding movements of the closure panel.

The second lever may be positioned at a distance behind the first lever.

The panel support is attached to the closure panel via a plurality of screwed connections, wherein a front screwed connection is arranged at a longitudinal position between the pivotal connections of the first and second lever to the panel support.

These positions of the levers enable the final adjustment and tightening of the front screwed connection in the closed position of the closure panel when the roof system is built into the vehicle roof.

BRIEF DESCRIPTION OF THE DRAWINGS

Further details and advantages of the invention will become clearer from the following description of embodiments of the roof system with reference to the drawings.

DETAILED DESCRIPTION OF THE ILLUSTRATIVE EMBODIMENT

Figure 1:
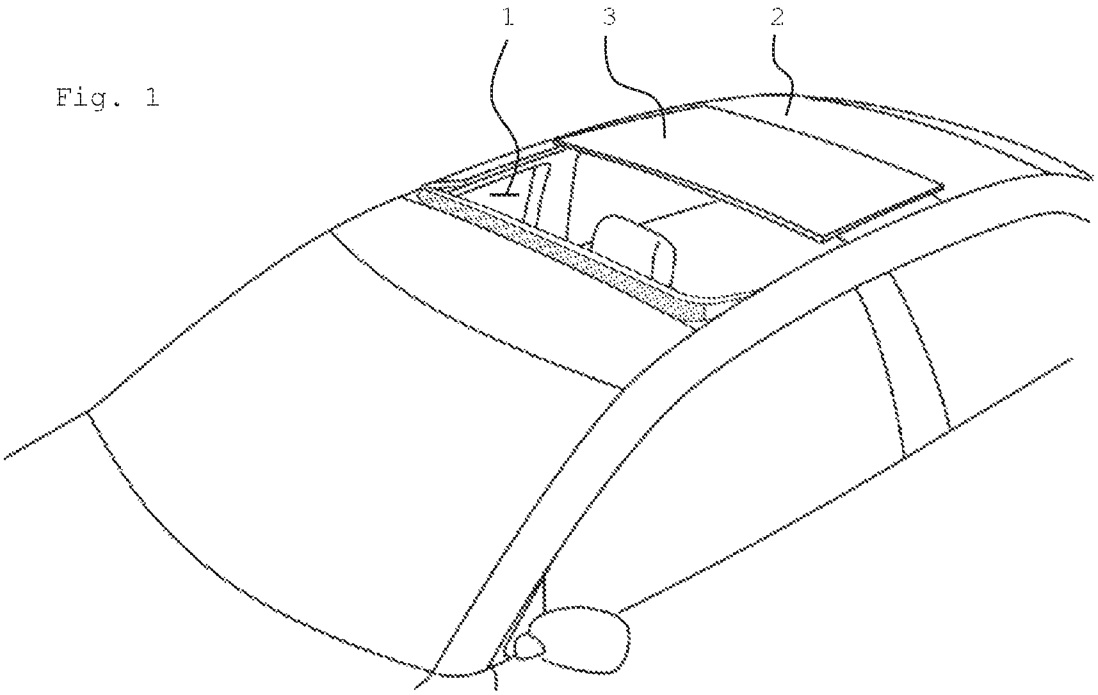
FIG. 1 is a partial perspective view of an automobile provided with a roof system with the closure panel of the roof system in an open position.

FIG. 1 shows part of a vehicle, in particular an automobile, which comprises at least a roof opening 1 defined in a (stationary) roof part 2. A closure, here in the form of a closure panel 3, is movable between a closed position (not shown) in which it closes roof opening 1, and an open position (FIG. 1) in which it opens roof opening 1 and in which it is positioned at least partially above roof part 2, here the fixed roof part adjoining the rear edge of the roof opening 1. To reach this position, closure panel 3 will first be moved to a so-called tilt or venting position in which the rear edge of closure panel 3 is lifted and closure panel 3 is therefore in a rearwardly and upwardly inclined position. From this tilt position, closure panel 3 is lifted at its front edge and is simultaneously slid rearwardly. Some variations of these movements are conceivable. For example, when closure panel 3 is moved from the closed to the tilt position, it could also slide a small distance rearward or forward and/or the front edge could be lifted slightly. Other variations are possible.

As is known per se such a roof system (which is also known as a spoiler roof or exterior sliding roof) could comprise additional elements, such as for example a tiltable wind deflector positioned ahead of the roof opening 1, or further movable or stationary panels, for example in a position behind closure panel 3 when it is in its closed position. In fact, in the present embodiment, the roof part behind the roof opening 1 is formed by a roof panel 2' which may be a stationary roof panel or a movable panel.

Figures 2A, 2B:
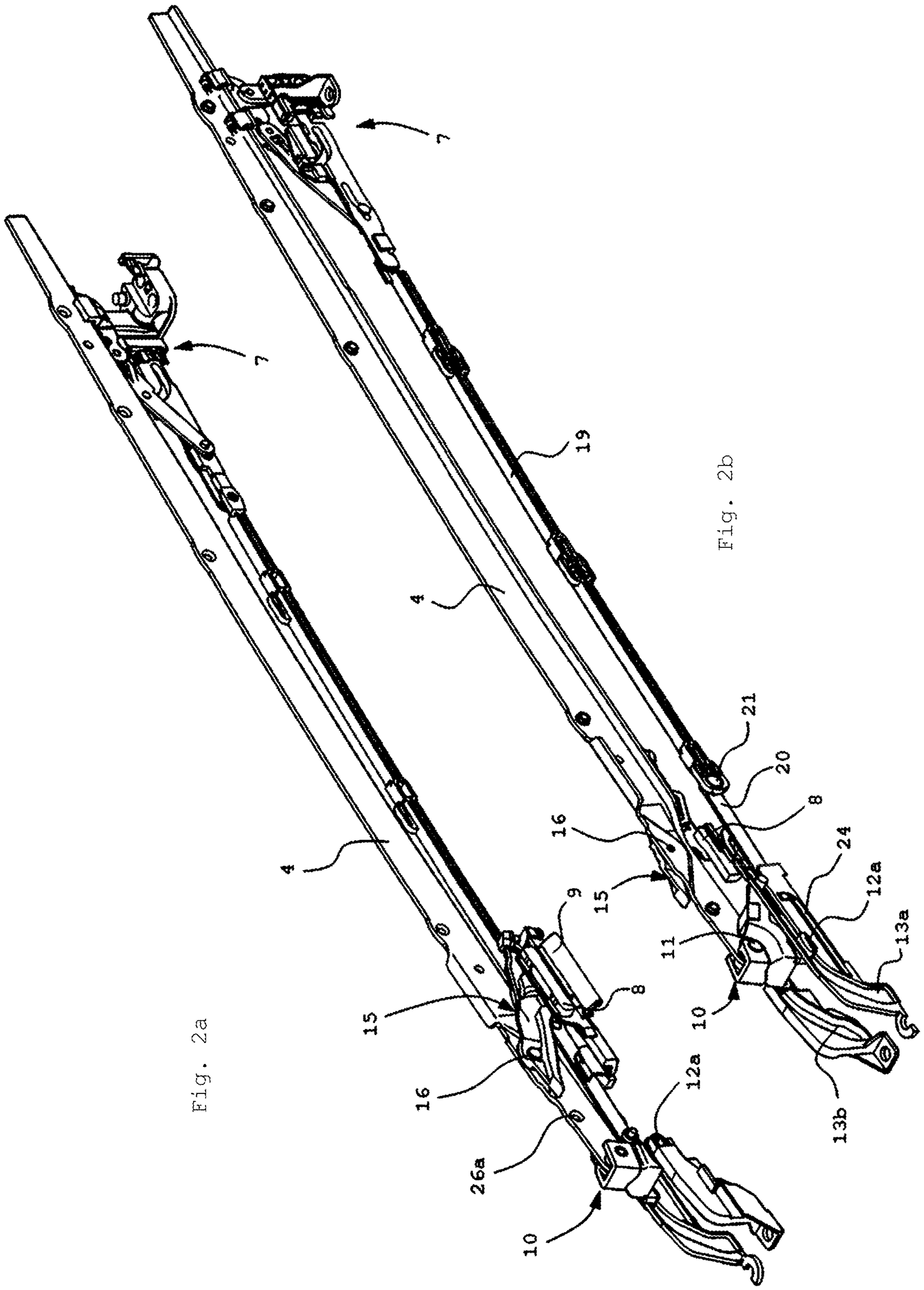
FIGS. 2*a*, 2*b* are enlarged perspective views of the operating mechanism for the closure panel on the right- and left-hand side of the closure panel, the operating mechanisms being in a position in which the closure panel is at the start of its sliding movement.

FIGS. 2*a*, 2*b*, 3*a*, 3*b* and 4 show the parts of an operating mechanism for closure panel 3 in order to move it between the closed and open positions. FIGS. 2*a* and 2*b* show the operating mechanism on both longitudinal sides of closure panel 3, and it is noted that the same parts albeit in mirror image are present on both sides of closure panel 3. The closure panel 3 comprises for example a glass or plastic transparent or metal non-transparent sheet supported on the longitudinal sides by a panel support 4 fixed to the sheet, for example by encapsulation material and/or any other means, such as glue, bolts or the like. At each longitudinal side edge of roof opening 1 there is provided a stationary guide rail 5 having several guide grooves in which parts of the operating mechanism are slidably guided. This guide rail 5 is shown partly by interrupted lines in FIG. 3*a* and a groove 5*a* of another part of guide rail 5 is shown by uninterrupted lines in FIG. 3*a*. The guide rails 5 are straight or slightly curved in order to follow the curvature of the vehicle roof. Such guide rails 5 are shown for example in U.S. Pat. No. 9,969,246, the whole content of which is incorporated herein by reference thereto.

To move closure panel 3 in longitudinal (along the guide rail 5) and vertical (substantially perpendicular to the guide rail 5) directions, the operating mechanism comprises a front device 6 to move the front side of closure panel 3 in horizontal and vertical direction and a rear device 7 to move the rear side of closure panel 3, in this case mainly in vertical direction, i.e., up and down. In this embodiment, rear device 7 is not or hardly not used for sliding panel 3 in longitudinal direction, but rear device 7 is adapted to allow panel 3 to slide with respect thereto when front device 6 moves panel 3 in longitudinal direction. Such rear device 7 is e.g., disclosed in DE202018104104.5U, the whole content of which is incorporated herein by reference thereto. Rear device 7 is not further described here.

Figure 3A:
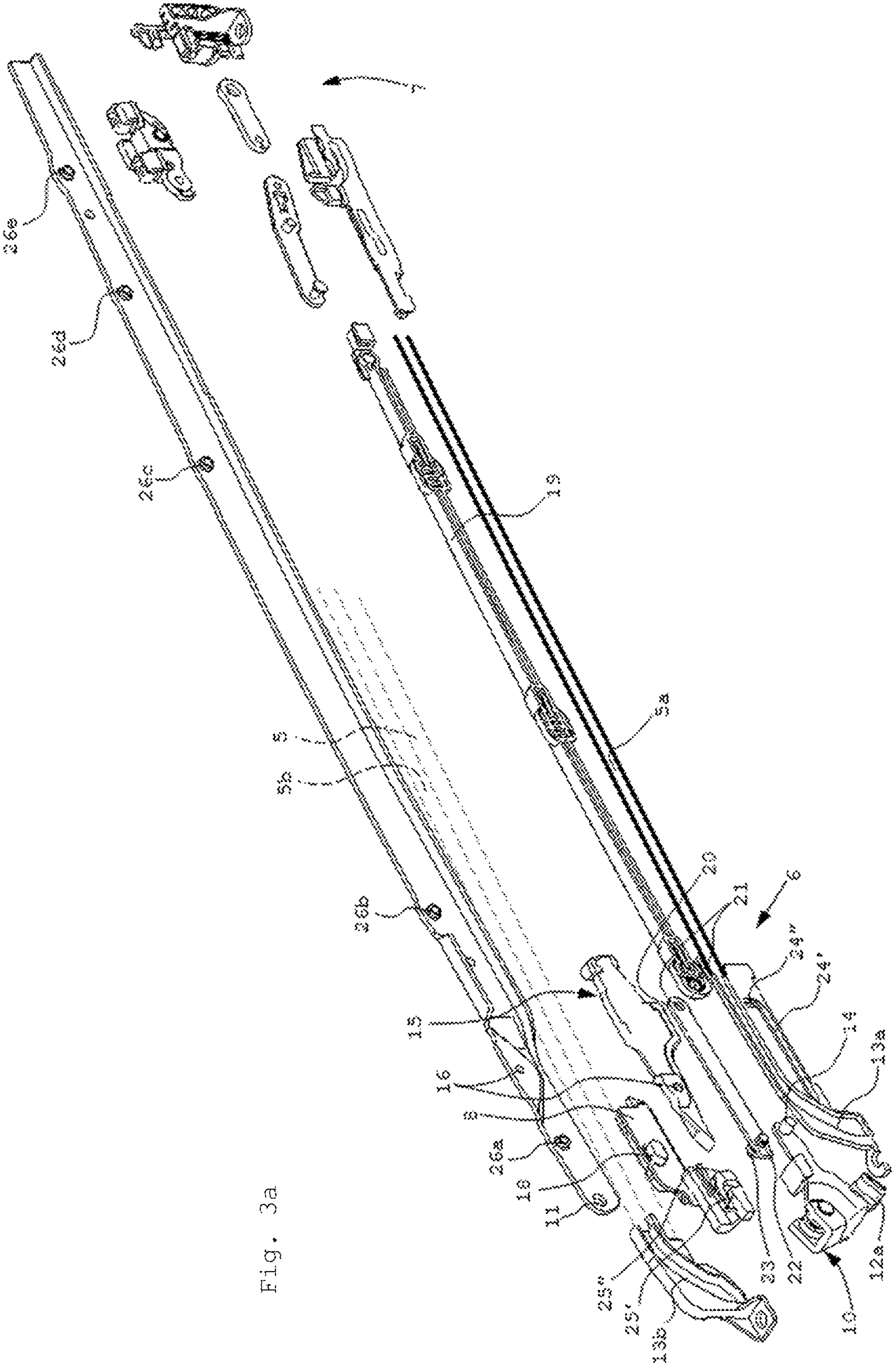
FIG. 3*a* is an exploded view of the operating mechanism of FIG. 2*b*.
Figure 3B:
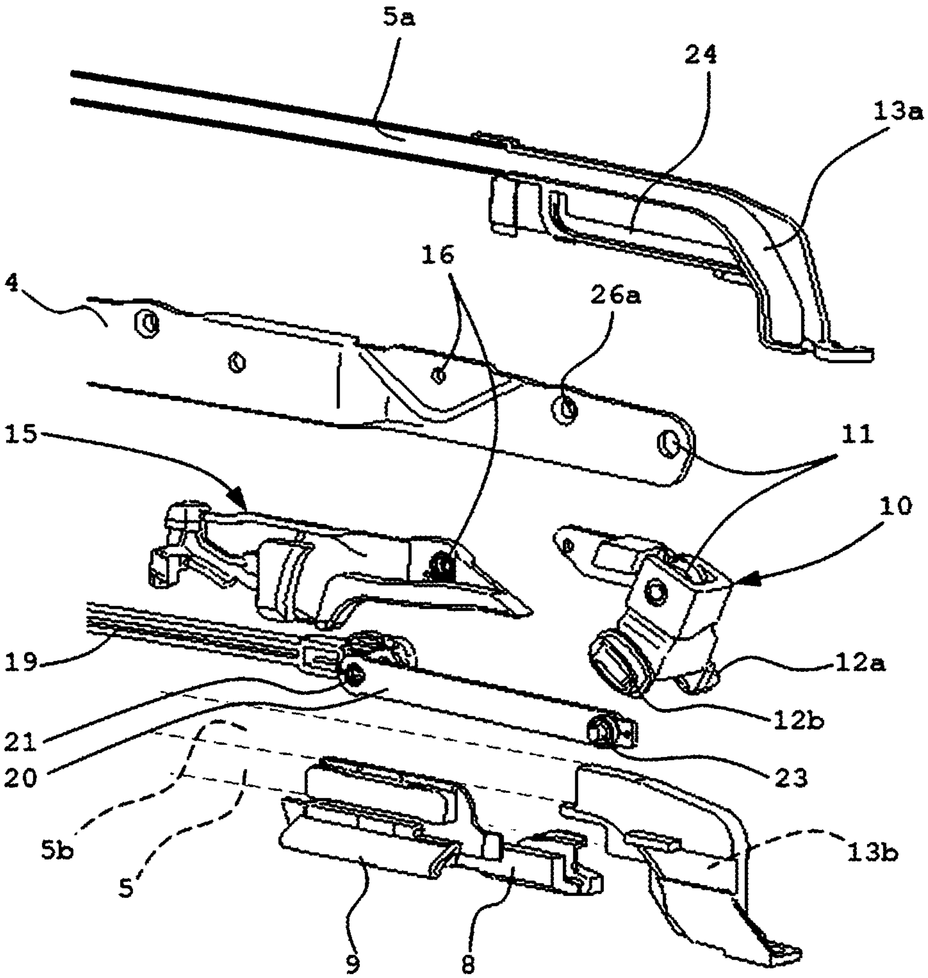
FIG. 3*b* is an enlarged view of the front portion of the operating mechanism of FIG. 3*a* as seen from the other side.
Figure 4:
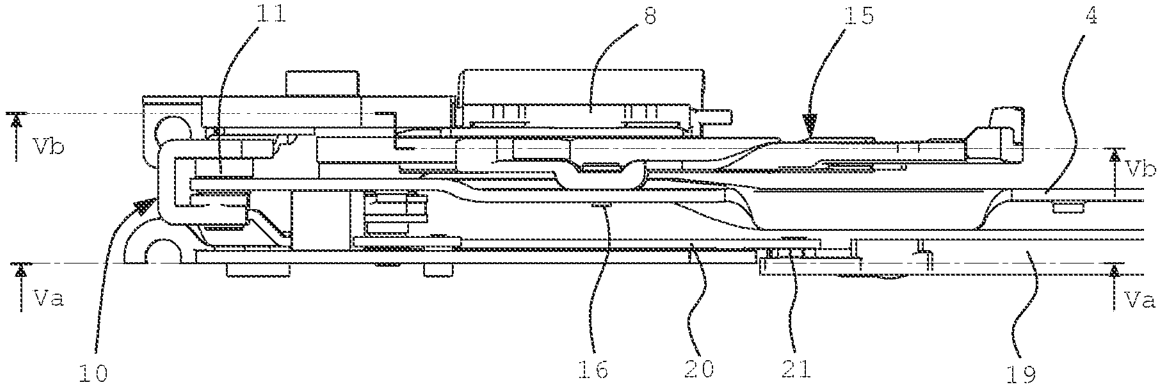
FIG. 4 is an enlarged plan view of the front portion of the operating mechanism of FIG. 2*b*.

The front device 6 is driven by a driving slide 8 connected to a drive cable (not shown) or other elongated drive member in engagement with a drive motor (not shown), in particular an electric drive motor, or a manual drive to move the drive cable back and forth. The driving slide 8 is slidably guided in guide rail 5. FIG. 3*b* shows a cable attachment 9 enabling the drive cable to be attached to driving slide 8.

Panel support 4 is supported on its front end by a first lever 10 pivotally attached to panel support 4 by a pivot 11 near the upper side of lever 10. At the lower side of lever 10 it is slidably supported by slide shoes 12*a* and 12*b* engaging in guide curves, partly formed by substantially straight groove 5*a* and another parallel groove 5*b* of guide rail 5 and partly formed by a front portion 13*a*, 13*b* respectively, connecting to the front end of grooves 5*a*, 5*b*. The front lower end of front portions 13*a*, 13*b* extend substantially vertical and the curve of the front portion 13*a*, 13*b* curves to a substantially horizontal orientation to connect to the respective groove 5*a*, 5*b* of guide rail 5. First lever 10 has a one-sided rear extension provided on its rear end with a slide shoe 14 engaging groove 5*a* of guide rail 5. Slide shoes 12*a*, 12*b* are spaced in transverse direction and opposed, while the cooperating guide curves 5*a*, 13*a* and 5*b*, 13*b* are also spaced and facing each other. The extension of first lever 10 carrying slide shoe 14 extends on one side of panel support 4 only.

The front device 6 comprises a second lever 15 which is pivotally connected to the panel support 4 on its front upper end through a pivot 16. The second lever 15 is controlled by driving slide 8, such that second lever 15 is allowed to pivot when closure panel 3 is moved in vertical direction and which is driven by the driving slide 8 when the closure panel 3 is moved in longitudinal direction. For this purpose, driving slide 8 and second lever 15 are in engagement with each other through a curve and pin connection, wherein a curve 17 in second lever 15 includes a sliding portion 17' enabling a pin 18 on driving slide 8 to move with respect to curve 17 in longitudinal direction of the vehicle and a locking portion 17" disabling pin 18 to move with respect to curve 17 and thus with respect to second lever 15 in longitudinal direction of the vehicle.

The driving slide 8 is connected to rear device 7 through a connecting rod 19 which has a pivoting front part 20 connected to connecting rod 19 through a pivot 21 on its rear end and being provided with two opposed pins 22, 23. Pin 22 engaging in a curve 24 in the plastic part comprising curve front portion 13*a*. This curve 24 comprises a long, substantially horizontal curve portion 24' and a short, substantially vertical, upward locking portion 24" at the rear end of portion 24'.

Pin 23 is adapted to engage a curve 25 in driving slide 8. Curve 25 includes a short, substantially horizontal portion 25' open on its front end and a short, substantially vertical, downward locking portion 25" connecting to the rear end of portion 25'.

Figure 5A:
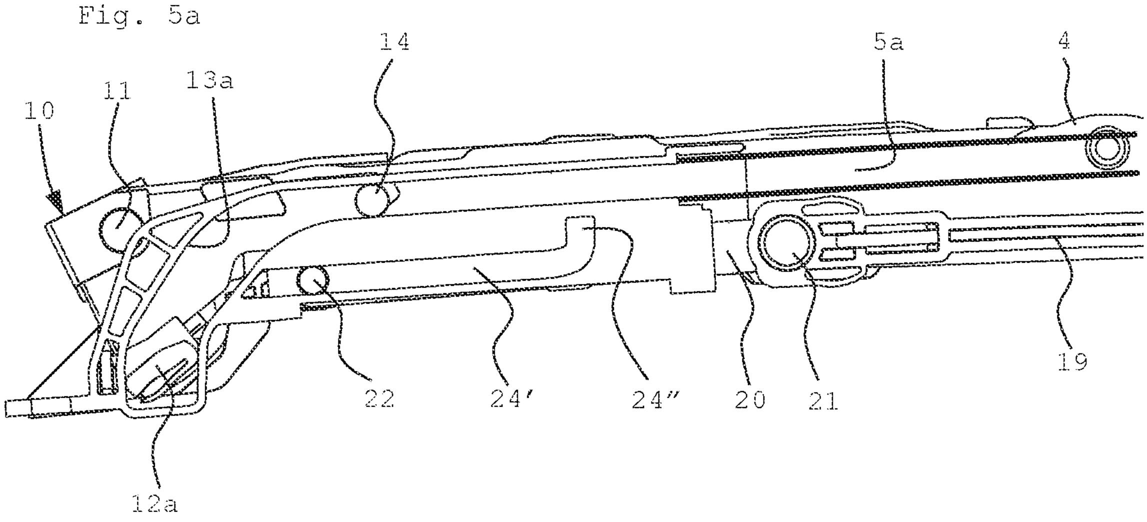
FIG. 5*a* is a sectional view along the line Va-Va in FIG. 4 in a position in which the closure panel is closed.
Figure 5B:
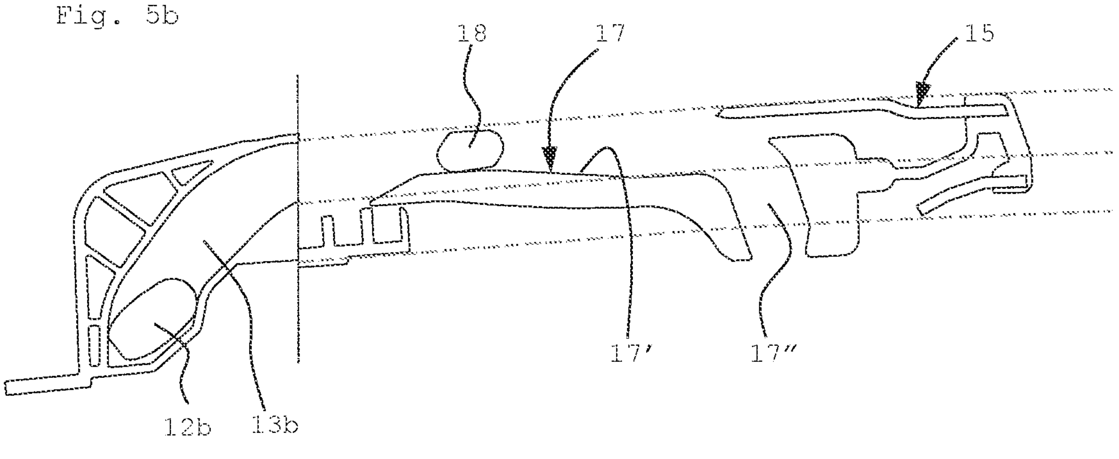
FIG. 5*b* is a sectional view along the line Vb-Vb in FIG. 4 to show parts hidden in FIG. 5*a*.
Figure 6A:
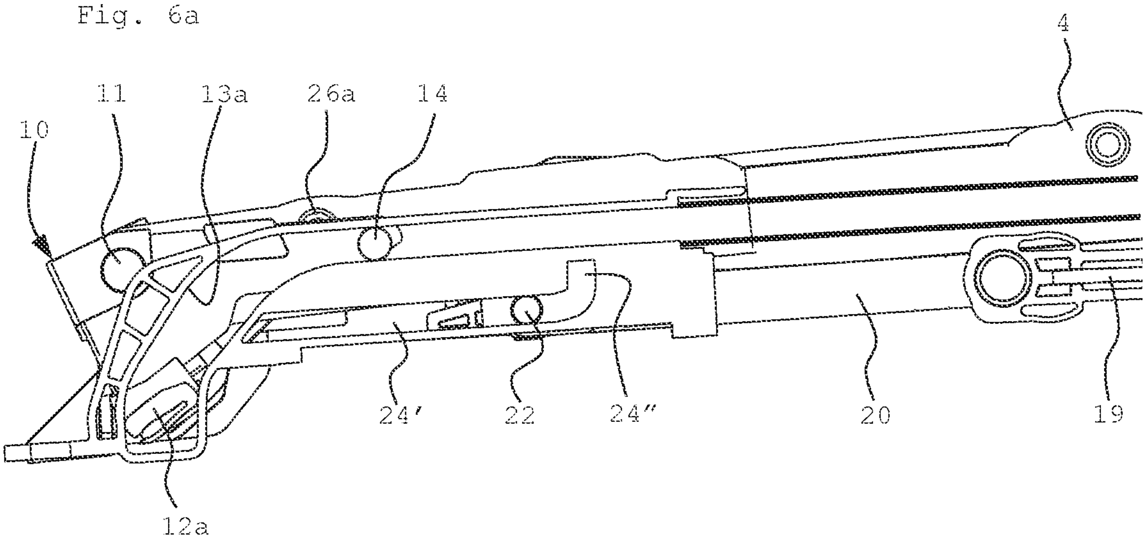
FIGS. 6*a* and 6*b* are sectional views corresponding to those of FIGS. 5*a* and 5*b* but showing the operating mechanism in a position in which the closure panel is in its tilt position.
Figure 6B:
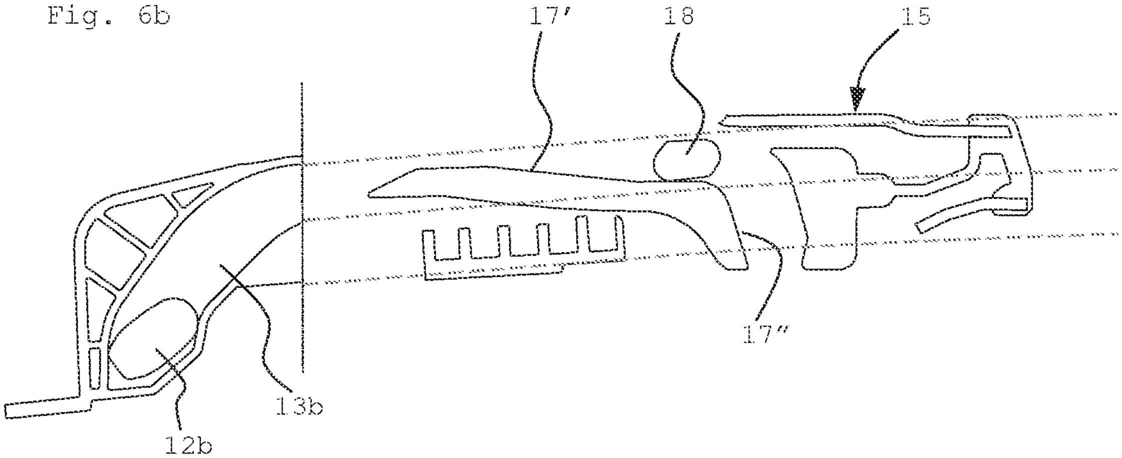
Figure 7A:
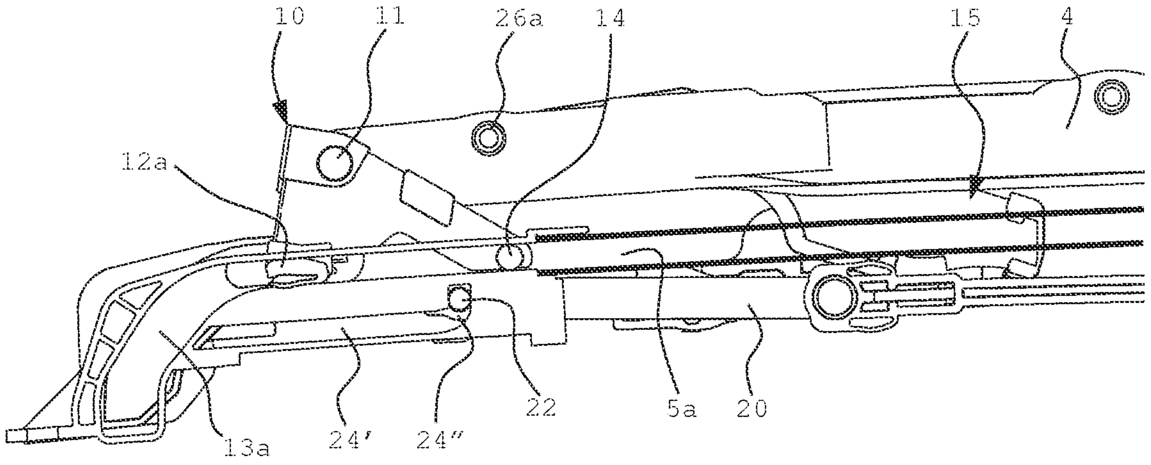
FIGS. 7*a* and 7*b* are sectional views corresponding to those of FIGS. 5*a* and 5*b* but showing the operating mechanism in a position in which the closure panel is at the start of its sliding movement.
Figure 7B:
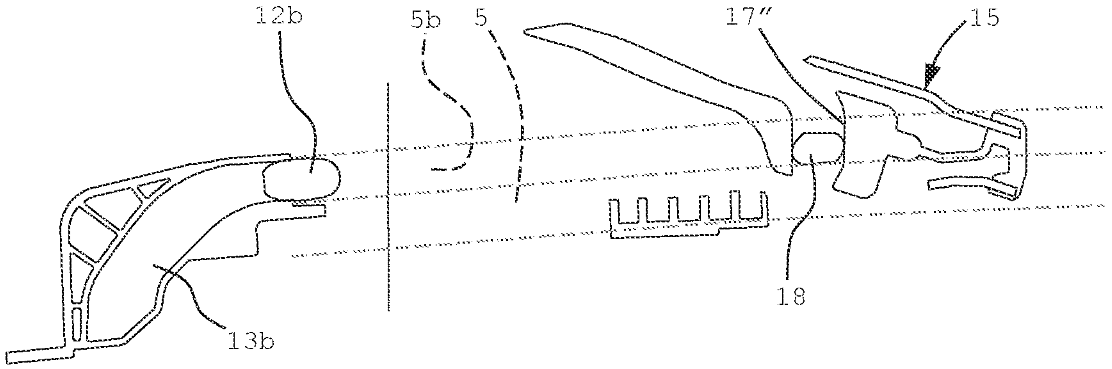

FIGS. 5, 6 and 7 show the operation of front device 6, in which FIGS. 5*a*, 6*a* and 7*a* show the operating mechanism from the outside and FIGS. 5*b*, 6*b* and 7*b* show the parts of front device 6 that are hidden in FIGS. 5*a*, 6*a* and 7*a*.

FIG. 5 shows front device 6 in a position in which closure panel 3 is in its closed position. Slide shoe 12*a*, 12*b* is in its front downward position within curve front portion 13*a*, 13*b*. Because rear slide shoe 14 is in groove 5*a* of guide rail 5, first lever 10 is in a forwardly tilted position in which pivot 11 to panel support 4 is in a position substantially above or slightly forward of slide shoes 12*a*, 12*b*. Pin 22 is at the front end of portion 24' of curve 24 and as a result, pin 23 is locked in locking portion 25" of curve 25 in driving slide 8 (not shown). This means that connecting rod 19 is locked with respect to driving slide 8 and therefore rear device 7 will be activated when driving slide 8 is moved. Pin 18 of driving slide 8 is at the start/front end of sliding portion 17' of curve 17 in second lever 15, as shown in FIG. 5*b*.

In FIG. 6, driving slide 8 is moved a distance rearwardly to thereby activate rear device 7 so as to tilt closure panel 3 to its venting position in which the rear of closure panel 3 is lifted. The panel support 4 is thus rotated around its front pivot 11 without hardly any movement of first lever 10 and thereby slide shoes 12*a*, 12*b*. This is an advantage over operating mechanisms in which a front slide shoe is attached directly to panel support 4 because a rotation of panel support 4 also dictates a rotation of front slide shoe, which may lead to complexities because the slide shoes are normally not circular in cross-section meaning that the curve and the slide shoe must be adapted to this rotation.

FIG. 6*a* shows that pin 22 is at the rear end of portion 24' of curve 24, in which pin 23 is still locked. Also pin 18 is at the rear end of sliding portion 17' of curve 17 in second lever 15. As second lever 15 is rotated slightly due to the rotation of panel support 4 sliding portion 17' of curve 17 in lever 15 is not straight but slightly curved. Sliding portion 17' remains in contact with pin 18 because there is a second pin engaging a curve at the lower side of second lever 15.

In FIG. 7, the front of panel support 4 and closure panel 3 is moved upwardly and rearwardly. This is a result of the fact that pin 18 has arrived in locking portion 17" of curve 17 in second lever 15, so that driving slide 8 is locked to second lever 15 and therefore a rearward sliding movement of driving slide 8 results in a rearward movement of closure support 4 and closure panel 3. The rearward movement of panel support 4 results in a rearward movement of slide shoe 14 of first lever 10 and an upward and rearward movement of slide shoes 12*a*, 12*b*. This leads to a rotation of first lever 10 around slide shoe 14 while it is moving rearwardly. Once slide shoes 12*a*, 12*b* have arrived in grooves 5*a*, 5*b* of guide rail 5, first lever 10 stops rotating and is just a sliding support for the front end of panel support 4 and closure panel 3.

FIG. 7*a* also shows that pin 22 has entered locking portion 24" of curve 24, so that pivoting front portion 20 of connecting rod 19 is locked with respect to guide rail 5 and therefore rear device 7 is locked in its upward position. On the other side of pivoting front part 20 of connecting rod 19, pin 23 is also moved upwards like pin 22, but this means for pin 23 that it is moved out of locking portion 25" of curve 25 in driving slide 8, so that driving slide 8 is free to move out of curve 25 and therefore free to move with respect to connecting rod 19. Thus, in this position driving slide 8 takes panel support 4 and closure panel 3 rearwardly through second lever 15, while panel support 4 slides with respect to rear device 7, as is known per se. Moving closure panel 3 back to its closed position leads to reversed movements of the parts as described above.

FIGS. 2 and 3 further show that panel support 4 is attachable to closure panel 3 via a plurality of screwed connections 26*a*-26*e*. The front screwed connection 26*a* is arranged at a longitudinal position between the first and second slide shoes 12*a* and 14 considered in the closed position of the closure panel 3. It is also arranged at a longitudinal position between the pivotal connections 11 and 16 of the first and second lever 10, 15 to panel support 4. The front screwed connection 26*a* is reachable with a tool from the side of panel support 4 where slide shoe 12*b* is positioned. As there is no fourth slide shoe, there is no part covering the screwed connection from this side. This makes it possible to change the height of closure panel 3 at the front side when closure panel 3 is in its closed position and to tighten the connection when correct. FIG. 6*a* shows that screwed connection 26*a* is covered by first lever 10 on the opposite side of panel support 4.

From the foregoing it will be clear that the invention provides an operating mechanism for a roof system having a front device which provides a stable support for the closure panel and a favourable movement of the front side of the closure panel. Furthermore, the first lever facilitates a modular design of the panel support as the slide shoes are now separate from the panel support.

The invention is not limited to the embodiment shown in the drawings and described above, which may be varied in different manners within the scope of the invention. Guide pins and cams may have all kinds of shapes and are not limited to the cross-sectional shapes shown in the drawings. The front device could also be used in other operating mechanisms, such as for example tilt-sliding roofs, topsliders and the like. Other movements of the front edge of closure panel could be achieved if desired.

The invention claimed is:

1. A roof system for a vehicle having a roof opening in a roof part thereof, comprising:

a closure panel which is movable between a closed position in which the closure panel closes the roof opening and an open position in which the closure panel opens the roof opening and is positioned at least partially above an adjoining portion of the roof part, the closure panel comprising a panel support, a stationary guide rail at each longitudinal side of said roof opening, and an operating mechanism slidably guided in each stationary guide rail and configured to operate the closure panel in a longitudinal direction of the vehicle, each operating mechanism comprising:

a rear device connected to the panel support and configured to move a rear edge of the closure panel towards a raised position relative to the closed position and above an adjoining portion of the roof part, a front device connected to the panel support and including a first lever configured to move a front edge of the closure panel in a vertical direction, a driving slide slidably accommodated in the stationary guide rail, and a drive member connected to the driving slide in order to move the closure panel both in vertical and in horizontal direction through the front device and rear device, wherein the first lever of the front device is pivotally connected to the panel support only and is provided with a first slide shoe which is in engagement with a stationary guide curve of the stationary guide rail, that includes a downwardly and forwardly inclining front portion, such that the first lever slides and tilts when the first slide shoe travels through the front portion of the stationary guide curve, wherein the first lever comprises a second slide show at a distance in longitudinal direction behind the first slide shoe, wherein the first lever comprises a third slide shoe substantially in line with the first slide shoe and in engagement with a second stationary guide curve of the stationary guide rail, the second stationary guide curve being parallel to the stationary guide curve, wherein the third slide shoe is laterally spaced from the first slide shoe, and wherein the first and second slide shoes are positioned on one side of the panel support and the third slide shoe is positioned on opposite side of the panel support, wherein the panel support is attached to the closure panel via a plurality of screwed connections, wherein a front screwed connection is arranged at a longitudinal position between the first and second slide shoes with the closure panel in the closed position and is reachable with a tool from a side of the panel support where the third slide shoe is positioned.

2. The roof system of claim 1, wherein the second slide shoe is in engagement with the stationary guide curve.

3. The roof system according to claim 2, wherein the second slide shoe is in engagement with a substantially straight portion of the stationary guide curve connecting to a rear end of the front portion thereof.

4. The roof system according to claim 1, wherein the panel support is connected to the first lever at a position above and in front of the first slide shoe.

5. The roof system according to claim 1, wherein the front device comprises a second lever which is pivotally connected to the panel support on one end of the second lever and which is controlled by the driving slide, such that the second lever is allowed to pivot when the closure panel is moved in the vertical direction, and which is driven by the driving slide when the closure panel is moved in the longitudinal direction.

6. The roof system according to claim 5, wherein the driving slide and the second lever are in engagement with each other through a curve and pin connection, wherein the curve has a sliding portion enabling the pin to move with respect to the curve in a longitudinal direction of the stationary guide rail and a locking portion disabling the pin to move with respect to the curve in the longitudinal direction of the stationary guide rail.

7. The roof system according to claim 5, wherein the second lever is positioned at a distance behind the first lever.

8. The roof system according to claim 7, wherein the front screwed connection is arranged at a longitudinal position between pivotal connections of the first and second lever to the panel support.

* * * * *